United States Patent [19]

Hooper

[11] 4,012,027
[45] Mar. 15, 1977

[54] METAL CUTTING MACHINE WITH SCRAP SAVING FEATURE

[75] Inventor: Harry Hooper, Brookfield, Wis.

[73] Assignee: C-R-O Engineering Co., Inc., Brookfield, Wis.

[22] Filed: Mar. 24, 1976

[21] Appl. No.: 670,048

[52] U.S. Cl. .............................. 266/58; 33/23 C; 83/50; 90/13.5; 144/144 R; 266/60; 318/577
[51] Int. Cl.² ........................................... B23K 7/02
[58] Field of Search ........... 33/23 C, 40, 81; 83/50, 83/565; 90/13.5, 13.8; 144/144 R; 266/48, 58–61, 64, 67; 318/577

[56] References Cited

UNITED STATES PATENTS

| | | | |
|---|---|---|---|
| 3,084,923 | 4/1963 | Arnault et al. | 33/23 C X |
| 3,172,938 | 3/1965 | Schwartz | 266/67 X |
| 3,559,971 | 2/1971 | Rogers | 266/67 X |
| 3,925,900 | 12/1975 | Raffensparger | 33/81 |

Primary Examiner—Roy Lake
Assistant Examiner—Paul A. Bell
Attorney, Agent, or Firm—Andrus, Sceales, Starke & Sawall

[57] ABSTRACT

A machine for repetitive cutting of small identical parts from a relatively large metal plate. A scanning head is positioned on a carriage above a template which is mounted to a tracing table, and one or more metal cutting heads are also mounted on the carriage. The scanning head is operable to drive the carriage and cutting head to cut a first series of one or more identically shaped parts from the plate. A further carriage on the machine is movable between a stop and an adjustable limit switch, with the adjusted distance between the stop and switch corresponding to the pre-determined distance it is desired to shift the tracing table to position the template for controlling the cutting of a second series of one or more identical parts from the same plate. The further carriage is selectively connected to a table moving mechanism, and such connection also actuates the latter to move the table until the carriage engages the limit switch. At this point, the table and template will be in the optimum position for cutting the second series of parts with a minimum of material waste.

6 Claims, 7 Drawing Figures

METAL CUTTING MACHINE WITH SCRAP SAVING FEATURE

PRIOR ART OF INTEREST

U.S. Pat. No. 2,679,620, 5/25/54, Berry,
U.S. Pat. No. 3,172,938, 3/9/65, Schwartz,
U.S. Pat. No. 3,289,540, 12/6/66, Bardwell et al.

BACKGROUND OF THE INVENTION

This invention relates to a metal cutting machine with a scrap saving feature.

The invention is directed primarily to machines for repetitive cutting of a plurality of small identical parts from a large flat metal plate, utilizing tracer controlled flame, plasma or laser cutting heads and the like. A scanning head is positioned above a template which is mounted to a tracing table. The scanning head is connected to drive one or a plurality of cutting heads and their supporting carriage to thereby cut a first series of one or more identically shaped parts from the plate-like workpiece.

When a first series of parts have been cut, it is desirable to cut a second and possibly more series of one or more parts from the same large workpiece. Heretofore this has been accomplished manually by the operator. Since the tracing table has previously been mounted for free movement transverse to the cutter carriage, the operator has manually shifted the table until, according to his visual observation, the lead-in indicia of the template was in a vertical plane parallel to the carriage and which passed through the workpiece just behind the previously cut-out portions. When the scanning head was moved to directly above this re-positioned indicia and the machine actuated, a second series of one or more parts was then cut out directly behind the first series.

The problem with the above-described operation has been that by depending on visual "eyeballing" to line up the template with the uncut portion of the workpiece, inaccuracies have often been found to occur. Thus, the operator did not always shift the tracing table and template far enough, the result being that the second series of cuts broke into the previously cut-out plate portions. Or, the operator may have shifted the table the template too far, leaving a large amount of workpiece unused. In the first case, the second series of one or more pieces was not fully formed and was completely wasted. In the second case, the workpiece was not utilized to its fullest. In both cases, a large amount of undesirable scrap resulted, thus increasing the cost of the operation.

SUMMARY OF THE INVENTION

The present invention solves the aforementioned problem and provides for reduction of scrap to a minimum. This is accomplished by eliminating the reliance on visual "eyeballing" when re-positioning the tracing table and template, and instead utilizing a system which provides for a predetermined uniform amount of table shift which always places the template lead-in indicia at an optimum position relative to the workpiece to provide a minimum amount of metal waste.

Broadly, it is contemplated that the invention provides means to automatically shift the tracing table and template from a first stationary position, wherein a first series of one or more parts was cut, to a second stationary position wherein a second series of one or more parts is cut and with the second series being uniformly as close as possible to the first series.

In a more specific sense, the inventive concept involves the utilization of motive means to shift the tracing table from a first cutting position, and means to automatically actuate the said motive means so that the table will be shifted a predetermined distance so that the template lead-in indicia will be properly positioned to minimize material waste on the next cut.

In the embodiment disclosed, the desired table advance is automatically obtained by an auxiliary carriage on the machine framework which is movable between a stop and an adjustable limit switch. The said carriage is normally biased against the stop, but is selectively connected to a tracing table drive element which shifts the carriage and table until the limit switch is engaged, with an accompanying disconnection of the said carriage from the drive element and also de-activation of the latter. The carriage thereupon returns to the stop. The adjusted position of the limit switch causes the tracing table to assume a shifted position so that the template lead-in indicia will be placed to provide the desired results.

The cycle may be repeated indefinitely.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
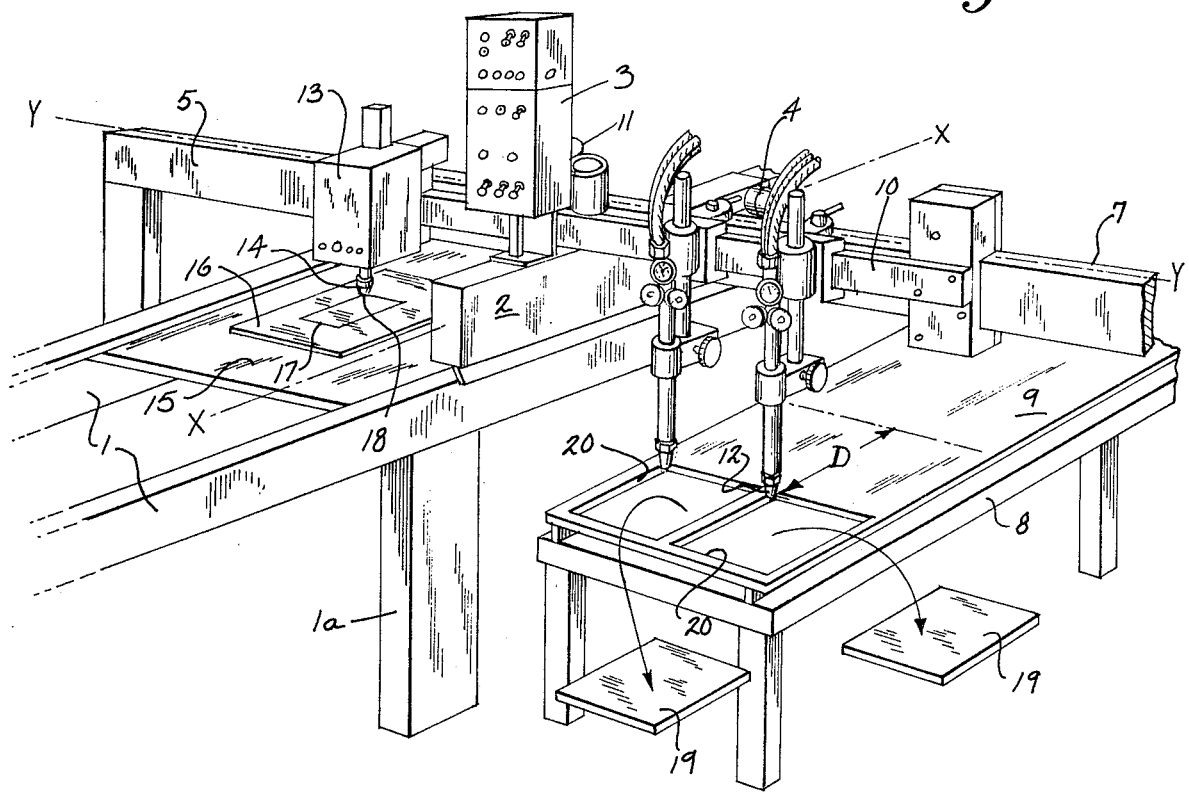
FIG. 1 is a schematic perspective view of a metal cutting machine incorporating the concept of the invention.
Figure 2:
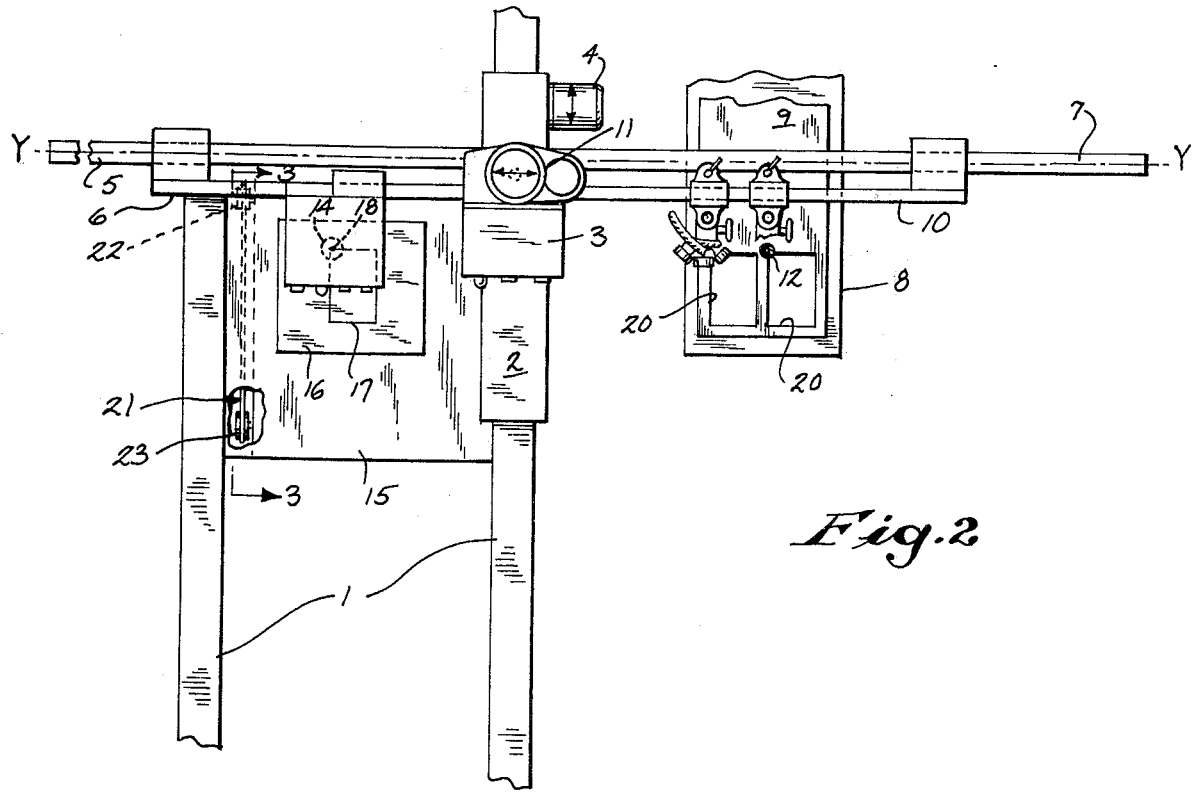
FIG. 2 is a schematic top plan view of the machine.

As shown in the drawings, the invention is embodied in a tracer controlled, coordinate drive metal cutting machine having a floor supported framework including a pair of longitudinal rails 1, mounted on legs 1a, on one of which is slideably or rollably mounted a first carriage 2 defining a longitudinal or X axis. Carriage 2 is controlled for movement along its axis through a main control panel 3 and an X axis motor 4. An elongated transverse rail 5 is rollingly supported at one end on the other rail 1, as at 6, is supportingly mounted at its mid-section by carriage 2, and has a free end portion 7 extending substantially beyond the machine support to thereby overhang a cutting table 8. Table 8 is fixedly mounted to the floor and is adapted to adjustably carry a horizontally disposed flat plate-like metal workpiece 9.

A second carriage 10 is slideably or rollably mounted on rail 5 and defines a transverse or Y axis. Carriage 10 is also controlled for movement along its axis through control panel 3, and by a Y axis motor 11.

One or more metal cutting heads 12 (two being shown herein) are adjustably mounted to carriage 10 above table 8 and are adapted to cut workpiece 9. Heads 12 may be of any suitable well-known type, such as flame or plasma torches or laser beam generators. They also may be actuated from control panel 3.

The machine is adapted for tracer control of X-axis and Y-axis coordinate drive motors 4 and 11, as by a scanning or tracing head 13 which is fixedly mounted on the inner end portion of carriage 10 remote from cutting heads 12. Head 13 may be of any suitable well-known type and may use an optical viewer 14 and photo-electric control system, not shown, to move carriages 2 and 10 so that cutting heads 12 describe a desired path which may include both curved and straight-line segments.

The tracing system includes a horizontal tracing table 15 which extends between rails 1 and is edge mounted for longitudinal sliding or rolling movement in the direction of the X axis. Table 15 is adapted to support a template 16 of any suitable type and which has indicia comprising either edges or lines 17 defining the configuration of one part to be cut singly or in multiples from workpiece 9. Template 16 is shown as having a lead-in or positioning indicia, such as a point 18, which is the starting position for tracing of the piece. As shown, point 18 is on a rear corner of template line 17, although the indicia could be anywhere on the template.

When the apparatus is actuated, tracing head 13 produces electrical signals in accordance with its position with respect to line 17. These signals are fed to the motor drive to cause head 13 to move along the line. Cutting heads 12 will thereby be caused to move along a corresponding path and, when energized, will cut a first series of identical side-by-side parts 19 from workpiece 9 along the front edge thereof. See FIG. 5. The part cut-outs are arrayed parallel to the transverse Y axis.

Once tracing head 13 has traversed the entire template line 17 and returned to the starting indicia, movement of the heads 12 and 13 stop, and the completed parts may be removed from the workpiece.

It is next desired to cut a second series of identical parts directly rearwardly of the first series. This requires adjustment of cutting heads 12 rearwardly from their final position at the first series of cut-outs 20 to a new starting position which is at a minimum distance behind cut-outs 20 commensurate with the ability to cut undistorted parts in the second series. This distance is known and is shown as D in FIGS. 1 and 7. In order for this to be accomplished, optical viewer 14, which is mounted on carriage 10 in a fixed positional relationship to cutting heads 12, must be re-positioned rearwardly the same distance D, shown in FIG. 4, to its new starting position.

In accordance with the invention, the new adjustment position of viewer 14 and hence cutting heads 12 is determined by shifting lead-in indicia 18 rearwardly the same distance D, which is accomplished herein by an automatic adjustment of table 15 on which template 16 is mounted. Undesirable manual adjustment of tracing table 15 by hit-or-miss visual methods is eliminated.

Figure 3:
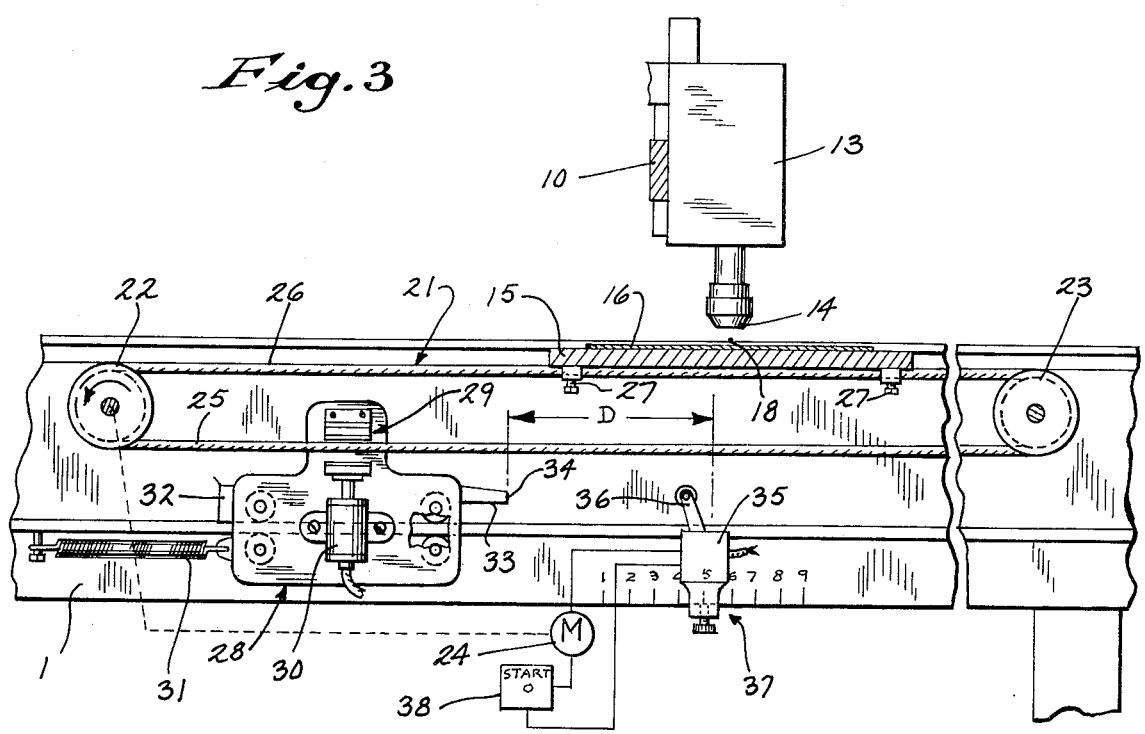
FIG. 3 is a transverse section taken on line 3—3 of FIG. 2 and showing the automatic table movement control means in a first position.

For this purpose, and as shown in FIG. 3, an automatic adjustment mechanism is disposed beneath tracing table 15. It includes an endless drive chain or cable 21 which extends longitudinally and which is trained above a drive sheave 22 and an idler sheave 23. Sheave 22 is rotatably driven by a motor 24. Cable 21 has a lower flight 25 which is adapted to move forwardly, and an upper flight 26 spaced from flight 25 and which is adapted to move rearwardly and which also is connected to tracing table 15, as at 27.

A shift member such as auxiliary carriage 28 is mounted for longitudinal rolling movement on the machine framework beneath table 15 and adjacent lower cable flight 25. A cable clamping member 29 on carriage 28 is disposed adjacent flight 25 and is normally in unclamped position, as shown in FIG. 3, so that the carriage is free of the cable. Member 29 is selectively actuatable by a cylinder 30 or the like to clamp onto flight 25 and thus secure the carriage and cable together, as will be more fully described hereinafter.

Carriage 28 is biased rearwardly by a spring 31 secured between the machine framework and the carriage. The rearward biased position of the carriage is limited by a fixed stop 32 on the framework which is normally engaged by the carriage, as shown in FIG. 3. A trigger or cam 33 is disposed on the forward end portion of carriage 28, and has a tip 34.

A limit switch 35 having a switch arm 36 is disposed on the machine framework forwardly of the normal position of carriage 28. Switch 35 is longitudinally adjustable to a plurality of fixed positions, and a scale 37 may be utilized for switch-setting purposes.

Figure 4:
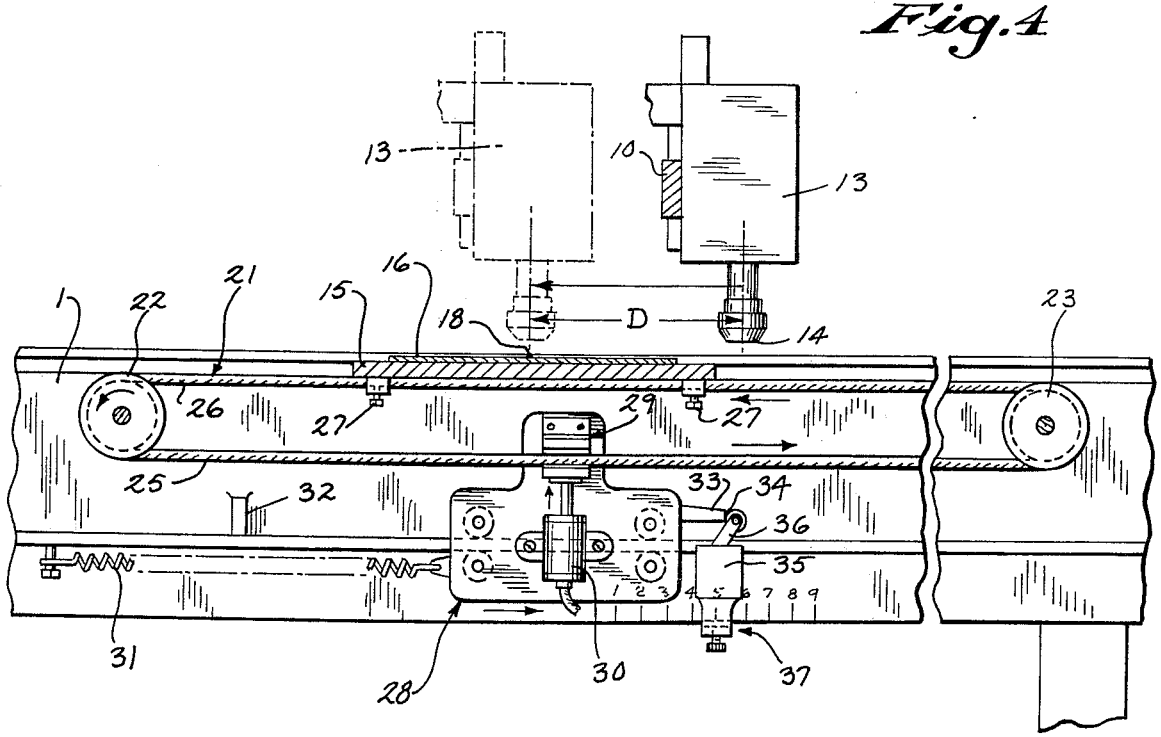
FIG. 4 is a view similar to FIG. 3 and showing the table and its control mechanism in shifted position.
Figure 5:
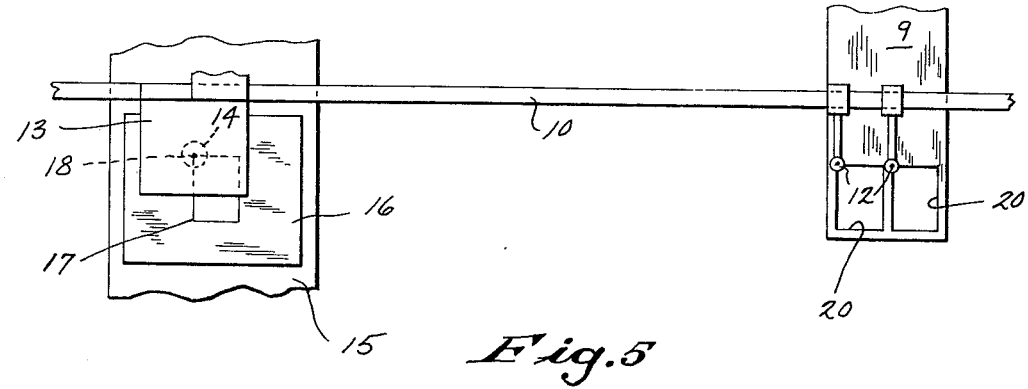
FIG. 5 is a diagrammatic top plan view of the template table and workpiece and showing the elements in position just after cutting the first series of parts, as in FIG. 3.

FIGS. 3 and 5 show the mechanism in position just after tracing head 13 has caused cutting heads 12 to complete the first cut, with head 13 returned to the template lead-in indicia 18. It is now desired to move tracing table 15, template 16 and indicia 18 rearwardly the distance D. For this purpose, cable motor 24 and cylinder 30 are suitably connected in any suitable well-known manner to a control switch 38 on panel 3. When switch 38 is actuated, cylinder 30 will be actuated to clamp carriage 28 to lower flight 25 of cable 22. See FIG. 4. Simultaneously, cable motor 24 will be actuated, thus causing carriage 28 to move forwardly with flight 25 toward limit switch 35, and causing tracing table 24 to move rearwardly an equal amount, the ratio being 1 to 1. The longitudinal position of limit switch 35 will have been adjusted so that when cam 33 engages switch arm 36 and when carriage 28 has moved the distance D, switch 35, which is also connected to cable motor 24 and cylinder 30, will deactivate both elements. This will cause clamping member 29 to release cable flight 25 and motor 24 to stop. See the showings of FIGS. 4 and 6.

As soon as the carriage is released from the cable, spring 31 will return the carraige to its original position, as in FIG. 3, ready for subsequent cyclings.

Figure 6:
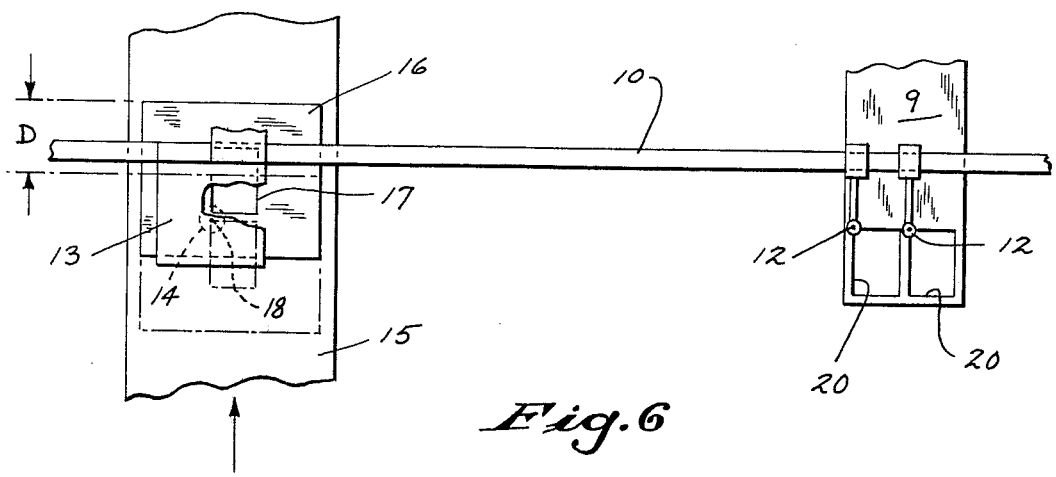
FIG. 6 is a view similar to FIG. 5 and showing the template and table moved as in FIG. 4.

After table 15 and template 16 have been shifted, as shown in full lines in FIG. 4, and also in FIG. 6, tracing head 13 will still remain at its original position above the prior placement of indicia 18. Likewise, and referring to FIG. 6, cutting heads 12 and the machine carriages 2 and 10 will still be in their prior positions. The operator may then utilize control panel 3 in the well-known way to actuate X-axis motor 4 to move carriage 2 until viewer 14 of tracing head 13 is directly above the re-positioned indicia 18 and is locked-in electronically in the usual manner. This position is shown in phantom in FIG. 4, and fully in FIG. 7. Note that viewer 14 and cutting heads 12 have now also moved distance D.

Figure 7:
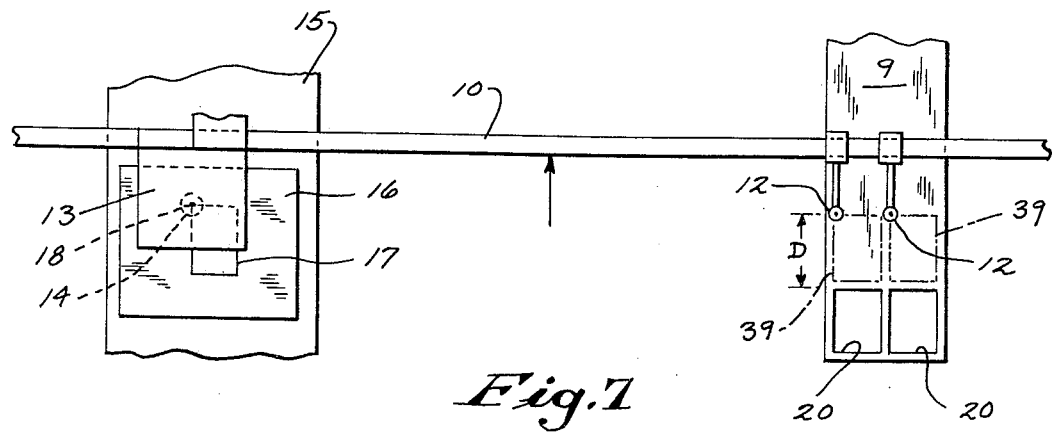
FIG. 7 is a view similar to FIGS. 5 and 6 and showing the tracing head and cutting heads moved into position to start the next cut.

The apparatus is now ready to make a second series of parts, as shown in dash lines at 39 in FIG. 7. Because of the automatic control of tracing table and template movement, these new parts will not overlap the original cut-outs 20, and will be at a minimum distance rearwardly thereof.

The automatic shifting cycle may be again repeated after the second series of parts has been cut, and subsequently. As long as the limit switch 35 remains unadjusted, the shift distance will be the same for each cycle.

Furthermore, while stop 32 has been described as fixed and limit switch 35 has been described as adjustable, either one or both could be adjustable to thereby define the preselected limits of movement of carriage 28 without departing from the spirit of the invention.

By eliminating manual shifting of the tracing table together with mere visual observation, the concept of the invention provides for a substantial reduction in wastage of the workpiece.

Various modes of carrying out the invention are contemplated as being within the scope of the following claims particularly pointing out and distinctly claiming the subject matter which is regarded as the invention.

I claim:

1. In a machine for cutting a plurality of identical parts from a plate-like workpiece wherein a tracing head is adapted to follow a template mounted on a cutting table for driving a workpiece cutting head through a plurality of successive cutting cycles: selectively actuatable means for shifting said template a pre-selected fixed distance automatically at the end of one cutting cycle to thereby re-position said template for the next succeeding cutting cycle.

2. The machine of claim 1 in which said template shifting means comprises:
   a. drive means connected to said tracing table for moving the latter longitudinally,
   b. and adjustable control means for actuating said drive means to move said table said pre-selected distance from said first to said second positions.

3. The machine of claim 2 in which:
   a. said drive means comprises:
      1. a longitudinally movable member connected to said tracing table,
      2. and motive means to move said movable member,
   b. and said control means comprises:
      1. a shift member movable between preselected limits and normally free of said longitudinally movable member,
      2. and means to connect said shift member to said longitudinally movable member and to simultaneously actuate said motive means so that said tracing table will be moved a distance corresponding to the distance between said limits.

4. The machine of claim 3:
   a. in which one of said pre-selected limits comprises a fixed stop,
   b. and which includes means to bias said shift member toward engagement with said stop.

5. The machine of claim 1 in which said template shifting means comprises:
   a. an endless cable with said cable having spaced flights, one of said flights being connected to said tracing table,
   b. a motor for driving said cable so that said flights move in opposite directions,
   c. a longitudinally movable shift member,
   d. a fixed stop defining a first limit of movement of said shift member,
   e. a limit switch connected to said motor and defining a second limit of movement of said shift member, said switch being actuatable to de-activate said motor,
   f. means to bias said shift member toward engagement with said stop,
   g. clamping means on said shift member and adapted to clampingly connect the latter with the other of said cable flights, said shift member and cable being normally disconnected,
   h. said limit switch being connected to deactivate said motor and clamping means,
   i. and means to simultaneously activate said motor and connect said clamping means to said other cable flight so that said cable carries said shift member from adjacent said stop and into engagement with said limit switch wherein said motor and clamping means are de-activated,
   j. said tracing table and other cable flight moving in opposite directions during movement of said shift member.

6. In a machine for cutting a plurality of parts from a plate-like workpiece:
   a. carriage means for movement along longitudinal and transverse axes,
   b. at least one cutting head mounted on said carriage means for cutting said workpiece,
   c. a longitudinally movable tracing table adapted to support a template having a positioning indicia thereon,
   d. a tracing head mounted on said carriage means and fixed relative to said cutting head and adapted to follow the contour of said template to thereby drive said carriage means in a first cutting cycle so that said cutting head cuts a first part from the said workpiece when said tracing table and template are in a first stationary position,
   e. and means to shift said template a preselected distance automatically and longitudinally from said first position to a second stationary position wherein the said template will be re-positioned for following by said tracing head in the next cutting cycle.

* * * * *